(12) United States Patent
Beaufrere

(10) Patent No.: US 12,415,471 B2
(45) Date of Patent: Sep. 16, 2025

(54) POWER SYSTEM FOR A TRANSPORT REFRIGERATION UNIT

(71) Applicant: Carrier Corporation, Palm Beach Gardens, FL (US)

(72) Inventor: Florian Beaufrere, Rouen (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 178 days.

(21) Appl. No.: 18/360,628

(22) Filed: Jul. 27, 2023

(65) Prior Publication Data

US 2024/0034254 A1 Feb. 1, 2024

(30) Foreign Application Priority Data

Jul. 28, 2022 (EP) ..................................... 22187528

(51) Int. Cl.
| | |
|---|---|
| *B60R 16/00* | (2006.01) |
| *B60H 1/00* | (2006.01) |
| *B60R 16/03* | (2006.01) |
| *F16H 61/02* | (2006.01) |

(52) U.S. Cl.
CPC ......... *B60R 16/03* (2013.01); *B60H 1/00428* (2013.01); *F16H 61/0213* (2013.01); *F16H 2061/0237* (2013.01)

(58) Field of Classification Search
CPC . B60R 16/03; B60H 1/00428; F16H 61/0213; F16H 2061/0237
USPC .......................................................... 701/36
See application file for complete search history.

(56) References Cited

U.S. PATENT DOCUMENTS

| | | | |
|---|---|---|---|
| 4,774,855 | A | 10/1988 | Murrell et al. |
| 7,713,157 | B2 | 5/2010 | Hastings et al. |
| 7,915,748 | B2 | 3/2011 | Storm et al. |
| 7,993,240 | B2 | 8/2011 | Weichbold et al. |

(Continued)

FOREIGN PATENT DOCUMENTS

| | | |
|---|---|---|
| CN | 203211083 U | 9/2013 |
| CN | 104319936 A | 1/2015 |

(Continued)

OTHER PUBLICATIONS

Extended European Search Report received for EP Application No. 22187528.9, mailed on Apr. 5, 2023, 09 Pages.

*Primary Examiner* — Mahmoud S Ismail
(74) *Attorney, Agent, or Firm* — Drew Folgmann

(57) ABSTRACT

A vehicle for transporting goods and a method of operating a power system of the vehicle are described. The vehicle comprises an axle; transport refrigeration unit; and power system. The power system comprises an energy storage device; a generator to generate electrical power and to supply electrical power to the energy storage device; a multi-speed gearbox mechanically coupling the axle to the generator; and a controller to receive data indicative of a speed of the vehicle and a state-of-charge of the energy storage device, and to control the multi-speed gearbox. The controller is configured to set a gear ratio of the multi-speed gearbox to a speed-based gear ratio when the vehicle is in a first state, wherein the speed-based gear ratio is selected based on the speed of the vehicle, and wherein the state-of-charge of the energy storage device is below a first charge threshold in the first state.

15 Claims, 3 Drawing Sheets

(56) References Cited

U.S. PATENT DOCUMENTS

| | | |
|---|---|---|
| 8,960,341 B2 | 2/2015 | Weber |
| 9,464,839 B2 | 10/2016 | Rusignuolo et al. |
| 10,752,110 B2 | 8/2020 | Quill et al. |
| 10,931,165 B2 | 2/2021 | Van Wijk |
| 11,021,066 B2 | 6/2021 | Kooi |
| 11,268,596 B2 | 3/2022 | Seipold et al. |
| 2008/0174174 A1 | 7/2008 | Burns et al. |
| 2020/0233410 A1* | 7/2020 | Burns .................... B60L 50/66 |
| 2022/0105808 A1* | 4/2022 | Ducher ........... B60W 30/18127 |
| 2022/0314738 A1* | 10/2022 | Beaufrere .......... B60H 1/00428 |

FOREIGN PATENT DOCUMENTS

| | | |
|---|---|---|
| DE | 202013004979 U1 | 10/2014 |
| GB | 2136069 B | 10/1986 |

\* cited by examiner

POWER SYSTEM FOR A TRANSPORT REFRIGERATION UNIT

CROSS REFERENCE TO RELATED APPLICATIONS

This application claims priority to EP Patent Application No. 22187528.9, filed on Jul. 28, 2022, which is incorporated by reference herein in its entirety.

BACKGROUND

The invention relates to power generation for a transport refrigeration unit (TRU) of a refrigerated vehicle.

Refrigerated vehicles transport perishable or temperature-sensitive goods within logistics networks. Refrigerated vehicles typically include a TRU that regulates the environment within a storage area of the vehicle, such as a container or trailer, within which the goods are stored during transit. The TRU includes a refrigeration system or the like, which is powered by an energy source. Traditionally, in the case of a tractor-trailer system where the storage area is within the trailer, the trailer has been provided with an internal combustion engine to power the TRU, which is separate from the internal combustion engine of the tractor providing motive force.

In recent years, electrical power sources have been used to power the TRU, rather than internal combustion engines. Such electrical power sources may include batteries that are charged using electrical energy from an electrical grid, and in some cases these can be recharged using a generator coupled to a wheel axle of the trailer. This increases the fuel consumption of the internal combustion engine of the tractor, but permits the use of a smaller battery.

A need exists to improve the generation of power for a TRU during the transportation of goods in a refrigerated vehicle.

SUMMARY

Viewed from a first aspect, there is provided a vehicle for transporting goods, the vehicle comprising: an axle; a transport refrigeration unit, TRU; and a power system, the power system comprising: an energy storage device configured to electrically power the TRU; a generator configured to generate electrical power and to supply the electrical power to the energy storage device; a multi-speed gearbox mechanically coupling the axle to the generator; and a controller configured to receive data indicative of a speed of the vehicle and a state-of-charge of the energy storage device, and to control the multi-speed gearbox; wherein the controller is configured to set a gear ratio of the multi-speed gearbox to a speed-based gear ratio when the vehicle is in a first state, wherein the speed-based gear ratio is selected based on the speed of the vehicle, and wherein the state-of-charge of the energy storage device is below a first charge threshold in the first state.

BRIEF DESCRIPTION OF THE FIGURES

Certain example embodiments of the invention will now be described by way of example only and with reference to the accompanying drawings in which.

DETAILED DESCRIPTION

Figure 1:
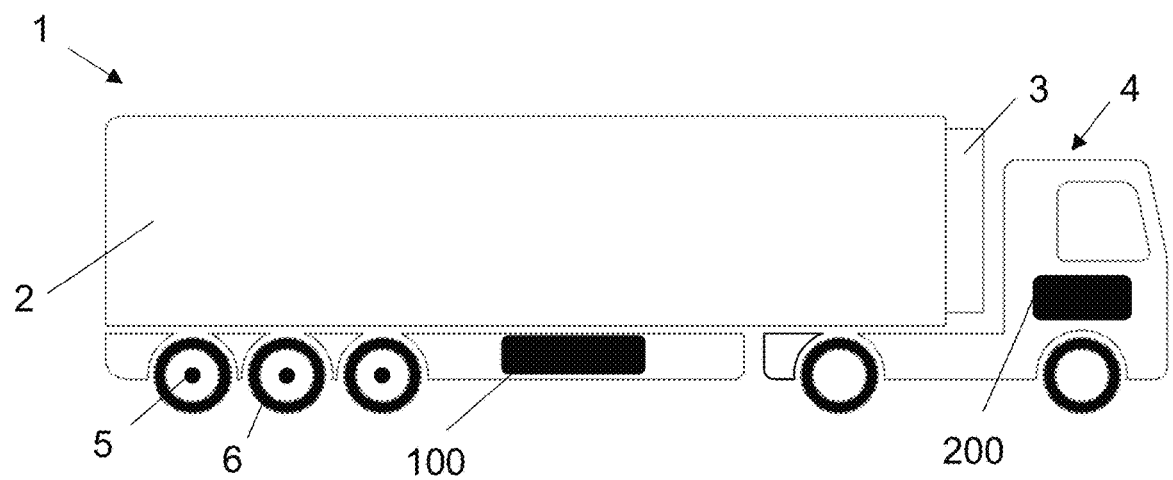
FIG. 1 shows a vehicle for transporting goods.

The electrical power generated by a generator is dependent on a rotational speed of a rotor of the generator. As the rotational speed of the axle will vary during operation of the vehicle, the electrical power generated by the generator also varies if a fixed-speed gearbox is used to couple the rotor of the generator to the axle. By employing a multi-speed gearbox, a gear ratio of the gearbox may be set based on the speed of the vehicle so as to maintain power output of the generator within a desired range across a larger range of vehicle speeds. Hence, a rotational speed of the generator rotor can be increased at lower vehicle speeds without causing the rotational speed of the generator rotor to exceed an operational limit of the generator at high vehicle speeds. In this manner, the electrical power may be generated efficiently across a wide range of vehicle speeds, and the TRU may be more reliably powered by the power system during transit of the vehicle.

As used herein, the term "gear ratio" refers to a ratio of the output rotational speed (i.e. the rotational speed of the generator rotor) to the input rotational speed (i.e. the rotational speed of the wheel axle). Thus, a "higher gear ratio" refers to a gear ratio that generates a higher rotational speed of the generator rotor at a particular wheel axle speed than a "lower gear ratio".

In one example, when the vehicle is travelling at a first speed, a first gear ratio can be selected, and when the vehicle is travelling at a second, higher speed, a second, lower gear ratio can be selected.

The speed-based gear ratio may be regarded as a gear ratio prioritising the generation of electrical power, rather than one which prioritises fuel efficiency of the vehicle. Other suitable terms for the speed-based gear ratio may be a power-optimised gear ratio or a power-state gear ratio. The speed-based gear ratio may be used in situations where maximum power generation is required, such as recharging of the energy storage device is required (e.g. due to a depleted state-of-charge).

By selecting the speed-based gear ratio when the vehicle is in a state in which the state-of-charge of the energy storage device is below the first charge threshold, the generator may be driven at a more desirable rotational speed such that adequate electrical power is generated to power the TRU via the energy storage device.

In some embodiments, the speed-based gear ratio may correspond to a maximum gear ratio of the multi-speed gear box that does not cause a rotational speed of the generator to exceed a predetermined rotational speed threshold at the respective speed of the vehicle.

The predetermined rotational speed threshold may correspond to an upper safety limit of the generator, for example. Thus, the speed-based gear ratio may be selected to maximise power output of the generator for the respective vehicle speed.

The multi-speed gear box may have a finite number of gear ratios. Thus, each gear ratio of the multi-speed gear box may be associated with a band of vehicle speeds for which it will be selected as the speed-based gear ratio. Optionally, the bands may overlap at their boundaries in order to prevent excessive gear box operation when moving at vehicle speeds near the band boundary. These bands may be determined analytically or empirically by the controller, or may be predetermined, for example at a time of manufacture or installation of the controller.

Thus, selecting the speed-based gear ratio may comprise comparing the speed of the vehicle to a band of speeds associated with each gear ratio of the multi-speed gearbox, and selecting a gear ratio of the multi-speed gearbox as the speed-based gear ratio when the speed of the vehicle is within the band of speeds associated with that gear ratio.

Higher gear ratios will increase a load on an engine propelling the vehicle, thereby increasing fuel consumption. This engine may be in the vehicle itself, or in a separate vehicle such as a tractor coupled to the vehicle. The fuel consumption will be particularly increased, relative to operation with a fixed-speed gearbox, when the vehicle is operated at lower speeds as a high gear ratio is selected to maintain a higher electrical power output of the generator.

In some situations, however, it may be desirable to reduce a gear ratio of the multi-speed gearbox below the speed-based gear ratio.

The controller may be configured to disengage the multi-speed gearbox or to set the gear ratio to a gear ratio that is lower than the speed-based gear ratio when the vehicle is in a second state, wherein the state-of-charge of the energy storage device is above the first charge threshold in the second state.

When the state-of-charge of the energy storage device is above the first charge threshold, it may be considered that the energy storage device has enough charge such that the generation of electrical power need no longer be prioritised over the conservation of fuel. Accordingly, in this state, a lower gear ratio may be selected relative to the speed-based gear ratio.

Optionally, in the second state, the gear ratio may be set to a load-based gear ratio. The load-based gear ratio may be selected based on a load associated with the TRU. For example, the load-based gear ratio may be selected such that a power output of the generator at the respective speed of the vehicle corresponds approximately to a power draw of the TRU. Thus, the state-of-charge of the energy storage device may remain substantially constant whilst the vehicle is moving.

It is anticipated that the load-based gear ratio will be lower than the speed-based gear ratio under most or all operating conditions. However, depending on the output power of the generator and the maximum demand of the TRU, the load-based gear ratio may be equal to the speed-based gear ratio in some systems and under some operating conditions.

By dynamically adjusting the selected gear ratio based on the state-of-charge of the energy storage device and the load of the TRU, adequate powering of the TRU may be balanced with fuel efficiency for the vehicle.

The first charge threshold may be regarded as a minimally acceptable value for the state-of-charge of the energy storage device, such that the TRU may be powered for a minimally acceptable amount of time whilst the vehicle is not moving. The first charge threshold may be at least 10%, at least 20%, at least 30%, at least 35%, at least 40%, at least 45% or at least 50% of a maximum capacity of the energy storage device.

The state-of-charge may be pre-determined, may be determined using any known technique by the controller, or may be determined by an external device in communication with the controller.

The controller may disengage the multi-speed gearbox when the vehicle is in a third state, wherein the state-of-charge of the energy storage is above a second charge threshold in the third state. The second charge threshold is greater than the first charge threshold. The controller may also set the gear ratio to a gear ratio that is lower than the speed-based gear ratio in the second state when the state-of-charge of the energy storage is below the second charge threshold. That is, the controller may be configured to set the gear ratio of the multi-speed gearbox to the load-based gear ratio when the vehicle is in the second state, wherein the state-of-charge of the energy storage device is equal to or between the first charge threshold and the second charge threshold in the second state. Thus, if the state-of-charge is low, the generator may still be used to generate some power even though it is inefficient to do so, but if the state of charge is sufficiently high, the controller will completely disengage the generator.

The second charge threshold may be regarded as a desirable or sufficient value for the state-of-charge of the energy storage device, for example so that the TRU may be adequately solely powered using the energy storage device for a period of time or so that recharging of the energy storage device need not be prioritised. The second charge threshold may be at least 70%, at least 75%, at least 80%, at least 85% or at least 90% of a maximum capacity of the energy storage device.

Optionally, the controller may disengage the multi-speed gearbox in the third state when the speed of the vehicle is increasing.

The controller may be configured to disengage the multi-speed gearbox or to set the gear ratio to a gear ratio that is lower than the speed-based gear ratio when the vehicle is in a fourth state, wherein the speed of the vehicle is increasing in the fourth state.

During acceleration, engine fuel efficiency typically decreases, meaning that operating the generator at this time also reduces the effective fuel efficiency of power generation by the generator. Accordingly, when the speed of the vehicle is increasing, it is desirable to reduce power generation. This action will reduce power generation at low fuel efficiency during acceleration, thus improving the overall fuel efficiency of the vehicle.

The controller may be configured to disengage the multi-speed gearbox when the vehicle is in a state in which the speed of the vehicle is increasing and the state-of-charge of the energy storage device is above the first charge threshold.

The controller may be configured to set the gear ratio to a gear ratio that is lower than the speed-based gear ratio (e.g. the load-based gear ratio) when the vehicle is in a state in which the speed of the vehicle is increasing and the state-of-charge of the energy storage device is below the first charge threshold.

Optionally, the controller may disengage the multi-speed gearbox in the fourth state when the state-of-charge of the energy storage is above a second charge threshold, and may set the gear ratio to a gear ratio that is lower than the speed-based gear ratio in the second state when the state-of-charge of the energy storage is below the second charge threshold. The second charge threshold is greater than the first charge threshold. Thus, if the state-of-charge is low, the generator may still be used to generate some power even though it is inefficient to do so, but if the state of charge is sufficiently high, the controller will completely disengage the generator.

Optionally, in the fourth state, the gear ratio that is lower than the speed-based gear ratio may be the load-based gear ratio, as described above.

The speed of the vehicle may be considered to be increasing when the rate of change of speed of the vehicle is increasing at a rate greater than a threshold rate. For example, the rate of change of speed of the vehicle may be determined to be increasing when the magnitude of the rate of change of speed of the vehicle is greater than at least 0.1 m/s2, at least 0.2 m/s2, at least 0.3 m/s2, at least 0.4 m/s2, at least 0.5 m/s2.

The vehicle may comprise one or more sensors for determining the speed and/or the rate of change of speed of the vehicle. The one or more sensors may be, for example, a wheel speed sensor or an accelerometer. Alternatively, the controller may receive data indicative of the speed of the vehicle from an external device, such as a device on a tractor drawing the vehicle or from a satellite position tracking system.

The controller may be configured to receive data indicative of a fuel level associated with an engine propelling the vehicle. The controller may be configured to disengage the multi-speed gearbox or to set the gear ratio to a gear ratio that is lower than the speed-based gear ratio when the vehicle is in a fourth state, wherein the fuel level is below a first fuel threshold in the fourth state.

When the vehicle is in a state in which the fuel level associated with an engine propelling the vehicle, such as a fuel level of a fuel tank used to drive the vehicle (e.g. a fuel tank of a tractor of a tractor-trailer system driving the vehicle, a locomotive driving the vehicle, or of a cab of the vehicle itself) is below the first fuel threshold, it may become advantageous to prioritise the conservation of fuel. Accordingly, when the controller determines that the vehicle is in the fourth state, the controller may select a gear ratio lower than the speed-based gear ratio to better conserve any remaining fuel until the fuel tank may be refilled.

The first fuel threshold may be regarded as a minimally acceptable value for the volume of fuel remaining to drive the vehicle until a refuelling station is likely encountered. This may correspond to the amount of fuel required to drive a certain range (e.g. more than 70 km, more than 80 km, more than 90 km or more than 100 km), such that the vehicle may likely reach a refuelling station. The first fuel threshold may be at least 5%, at least 10%, at least 15% of the capacity of a fuel tank used to drive the vehicle.

Optionally, the controller may disengage the multi-speed gearbox in the fourth state when the state-of-charge of the energy storage is above a third charge threshold, and may set the gear ratio to a gear ratio that is lower than the speed-based gear ratio in the fourth state when the state-of-charge of the energy storage is above the third charge threshold. The third charge level may be lower than the first charge level. Thus, the controller may allow the battery to discharge to a relatively low level when fuel levels are low, but may nevertheless maintain operation of the TRU.

Optionally, in the fourth state, the gear ratio that is lower than the speed-based gear ratio may be the load-based gear ratio, as described above.

The controller may be configured receive data indicative of braking of the vehicle and/or data indicative of an engine retarder associated with an engine propelling the vehicle being engaged. The controller may be configured to set the gear ratio to the speed-based gear ratio when the vehicle is in a fifth state, wherein the vehicle is braking and/or the engine retarder is engaged in the fifth state and the state-of-charge of the energy storage device is above the first charge threshold.

When the vehicle is braking and/or an engine retarder associated with an engine propelling the vehicle is engaged, energy is lost through the active slowing of the vehicle and/or a second vehicle driving the vehicle. During braking and/or engine retardation of the vehicle, a higher gear ratio may be selected to convert energy otherwise lost during braking and/or engine retardation into electrical power without detriment to the fuel efficiency for driving the vehicle, even when the state-of-charge of the energy storage device is above its normal charge threshold. Accordingly, by using the speed-based gear ratio when the vehicle is in the fifth state, the vehicle can maximise power generation without being of practical detriment to the fuel efficiency.

The controller may also be configured to determine if the vehicle is braking, such as based on the real-time location data or other data received by the controller. The data received by the controller may be data regarding e.g. a brake pedal position of the vehicle or e.g. a tractor or locomotive providing motive force to the vehicle.

The generator may also be referred to as an axle-generator, as the generator is driven by the rotation of the axle when coupled to generate electricity. The generator may be an induction generator.

The generator may be configured to directly power the transport refrigeration unit in addition to powering the energy storage device. That is, the electricity generated by the generator when coupled to the axle may be directly supplied to the transport refrigeration unit.

The energy storage device is configured to store electrical energy. The energy storage device may be a rechargeable battery, capacitor or the like. The energy storage device may be charged by the generator. The energy storage device may supply electricity to the TRU. The energy storage device may be configured to be charged via an electrical grid, when the vehicle is stationary.

The generator may recharge the energy storage device when the generator generates surplus electricity. That is, when the rate at which the generator generates electricity exceeds the power demand of the TRU, the surplus electricity generated by the generator may be used to recharge the energy storage device. This may be the case, for example, at high generator rotor speeds. Hence, electricity generated by the generator is efficiently harvested such that the TRU may be operated using regenerated electricity where possible. This may increase the time the vehicle may operate between destinations without requiring the energy storage device to be recharged. This may also increase the efficiency of fuel consumption by the vehicle, as energy is more efficiently harvested by the generator and a lower gear ratio may be selected by the controller when appropriate.

The energy storage device and the generator may simultaneously power the TRU. For example, if the power demand of the TRU exceeds the rate at which the generator is generating electricity when coupled to the axle, the energy storage device may supplement the power provided by the generator. This may be the case, for example, at low vehicle speeds/low generator rotor speeds. Accordingly, the TRU may be powered by the generator and the energy storage device in tandem such that the power demands of the TRU are always met. Further, by powering the TRU using the generator in tandem with the energy storage device, the energy storage device may discharge energy at a slower rate than if the TRU were to be powered solely by the energy storage device. That is, by prioritising the use of regenerated electricity for powering the TRU the lifetime between charges for which the TRU may be adequately powered by the power system is increased.

The axle may be a passive axle, i.e. it may be rotated due to a contact force between a wheel connected to the axle and a driving surface. The axle may be coupled to a wheel of the vehicle, and the wheel may be configured to contact a road or rail surface. Thus electrical energy may be harvested from the motion of the vehicle, via the rotation of its wheels.

The multi-speed gearbox may comprise, or be provided in combination with, a clutch. The clutch may be selectively operated by the controller to disengage or engage the multi-speed gearbox from the axle of the vehicle, as desired.

The vehicle may be a passive vehicle, i.e. not comprising a motor or engine for driving the vehicle, such as a trailer, goods wagon or the like. The vehicle may not be capable of providing a driving/motive force itself. Instead, the passive vehicle may be driven by a respective driving vehicle, such as a truck, train or the like, which provides a driving/motive force to the vehicle. Accordingly, the axle may be indirectly driven via the driving force provided by the driving vehicle, e.g. through a contact force with a road surface, rail or other suitable driving surface.

The vehicle may alternatively be an active vehicle, such as a box lorry or van. That is, the vehicle may comprise an engine which provides a driving/motive force to the vehicle. In addition, the vehicle may comprise a storage area where the TRU is located and where goods may be contained. The vehicle may hence be capable of providing a driving/motive force itself rather than being a vehicle which is towed by a driving vehicle. The vehicle may comprise an active axle through which the driving force is delivered, and a passive axle which is indirectly driven via the driving force, e.g. through a contact force with a road surface, rail or other suitable driving surface. The generator may be selectively coupled to the passive axle. In such a system the power system may generally operate independently of the vehicle engine.

The vehicle may comprise a passive vehicle and an active vehicle. The passive vehicle may be driven by the active vehicle. For example, the vehicle may be a tractor-trailer system. The axle may be an axle of the tractor. The axle may be an axle of the trailer. The TRU may be housed within the trailer.

Viewed from a second aspect of the present invention, there is provided a tractor-trailer system for transporting goods. The system comprises: a tractor for driving the tractor-trailer system; and a trailer, wherein the trailer is a vehicle according to the first aspect.

The tractor-trailer system of the second aspect may have one or more or all of the features (including optional features) of the vehicle of the first aspect. Thus the above description may be equally applicable to the tractor-trailer system of the second aspect.

The tractor may comprise an engine management system. The engine management system may comprise a plurality of sensors configured to determine one or more operational parameters of the tractor. The controller may be configured to receive one or more of the operational parameters from the engine management system. The controller may be configured to determine a state of the trailer based on the operational parameters and to determine a state of the trailer based on the operational parameters.

By determining the rate of change of the trailer based on the operational parameters from the engine management system, the power system may more reliably determine a state of the trailer. Accordingly, the controller may more reliably select a gear ratio as required, such that the tractor may consume fuel more efficiently during operation of the tractor-trailer system.

The operational parameters may comprise a vehicle speed, a fuel level or a braking status.

The tractor propels the trailer, and hence the trailer will accelerate and brake in tow with the tractor. As such, the operational parameters of the tractor may be equally applicable to the trailer and hence may be suitable for determining the speed and/or the rate of change of speed of the trailer.

One of the operational parameters may be a brake pedal position. The controller may be configured to determine if the brake pedal is depressed and/or engaged. The controller may be configured to determine that the trailer is in the fifth state and couple the generator to the trailer when the vehicle is in the fifth state. The brake pedal may be depressed and/or engaged when the vehicle is in the fifth state.

Brake pedal position will be understood to be the position of the brake pedal of the tractor. When the brake pedal is engaged, the braking system of the tractor will be activated such that the tractor-trailer system will decelerate, i.e. its rate of change of speed will be substantially less than zero. During braking, energy is lost from the tractor-trailer system. Rather than dissipating all the energy via the brakes, the generator may instead be driven by a higher gear ratio such that energy which would otherwise be lost during braking may be converted into electricity using the generator.

Other operational parameters may include, for example, tractor speed, accelerator pedal position, total fuel usage, fuel level, engine speed and vehicle distance. The operational parameters may be measured and/or determined using known sensors, techniques or methods.

The engine management system may be in wireless communication with the power system. The engine management system may be wirelessly connected to the power system. The wireless connection may be regarded as a wireless interface. The engine management system may exclusively be in wireless communication with the power system. That is, there may be no wired and/or electrical contact connections between the power system and the engine management system.

Viewed from a third aspect of the present invention, there is provided a method of operating a power system of a vehicle for transporting goods, the vehicle comprising a transport refrigeration unit, TRU, and the power system comprising an energy storage device operable to electrically power the TRU, a generator configured to generate electrical power and to supply the electrical power to the energy storage device, and a multi-speed gearbox mechanically coupling an axle of the vehicle to the generator, the method comprising: setting a gear ratio of the multi-speed gearbox to a speed-based gear ratio when the vehicle is in a first state, wherein the speed-based gear ratio is selected based on a speed of the vehicle, and wherein a state-of-charge of the energy storage device is below a first charge threshold in the first state.

The method of the third aspect may have one or more features corresponding to one or more or all of the features (including optional) features of the vehicle of the first aspect, and/or of the tractor-trailer system of the second aspect. Thus the above description may be equally applicable to the method of the third aspect.

The method of the third aspect may be a method of operating a power system of the vehicle of the first aspect.

The speed-based gear ratio may correspond to a maximum gear ratio of the multi-speed gear box that does not cause a rotational speed of the generator to exceed a predetermined rotational speed threshold at the respective speed of the vehicle.

The method may comprise disengaging the multi-speed gearbox or setting the gear ratio to a gear ratio that is lower than the speed-based gear ratio when the vehicle is in a second state, wherein the state-of-charge energy storage device is above a second charge threshold in the second state.

The method may comprise setting the gear ratio to a gear ratio that is lower than the speed-based gear ratio when the vehicle is in the second state, wherein the state-of-charge of the energy storage device is above the first charge threshold and below a second charge threshold in the second state, wherein the second charge threshold is greater than the first charge threshold.

The method may comprise disengaging the multi-speed gearbox when the vehicle is in a third state, wherein the state-of-charge of the energy storage device is above the second charge threshold in the third state.

The method may comprise disengaging the multi-speed gearbox or setting the gear ratio to a gear ratio that is lower than the speed-based gear ratio when the vehicle is in a fourth state, wherein the speed of the vehicle is increasing in the fourth state.

The method may comprise disengaging the multi-speed gearbox or setting the gear ratio to a gear ratio that is lower than the speed-based gear ratio when the vehicle is in a fifth state, wherein a fuel level associated with an engine propelling the vehicle is below a first fuel threshold in the fifth state.

The method may comprise setting the gear ratio to a gear ratio to the speed-based gear ratio when the vehicle is in a sixth state, wherein the vehicle is braking in the sixth state.

FIG. 1 shows a vehicle 1 for transporting goods which, in the present embodiment, is a tractor-trailer system 1. The tractor-trailer system 1 comprises a trailer 2 and a tractor 4. Generally, the tractor-trailer system 1 is driven by the tractor 4. That is, the tractor 4 comprises an engine which drives both the tractor 4 and the trailer 1.

The tractor 4 comprises an engine management system 200, which comprises a plurality of sensors configured to monitor one or more operational parameters of the tractor 4. In the present embodiment, the engine management system 200 comprises the engine, and an engine retarder associated with the engine.

The trailer 2 comprises an internal space for storing cargo such as a container or the like, and a transport refrigeration unit (TRU) 3, which regulates an environment within the internal space. The TRU 3 comprises a number of components such as a compressor, an evaporator fan and a condenser fan which require electrical power. The TRU 3 operates to cool or heat the trailer 2 depending on a desired mode of operation.

The trailer 2 comprises a plurality of wheels 6, each of which rotate via an axle 5. The axles 5 may each be regarded as passive axles 5, as they are not provided with a motive force by the engine of the tractor 4. Instead, they rotate due to a contact force between a respective wheel 6 and the surface the wheels 6 contact, such as a road surface.

The trailer 2 also comprises a power system 100. The power system 100 is arranged to supply electrical power to the TRU 3. The power system 100 powers the TRU 3 such that the TRU 3 can regulate the internal space of the trailer 2. Whilst in the present embodiment the power system 100 is located as part of the trailer 2, the power system 100 could be located at any suitable location of the vehicle 1.

Figure 2:
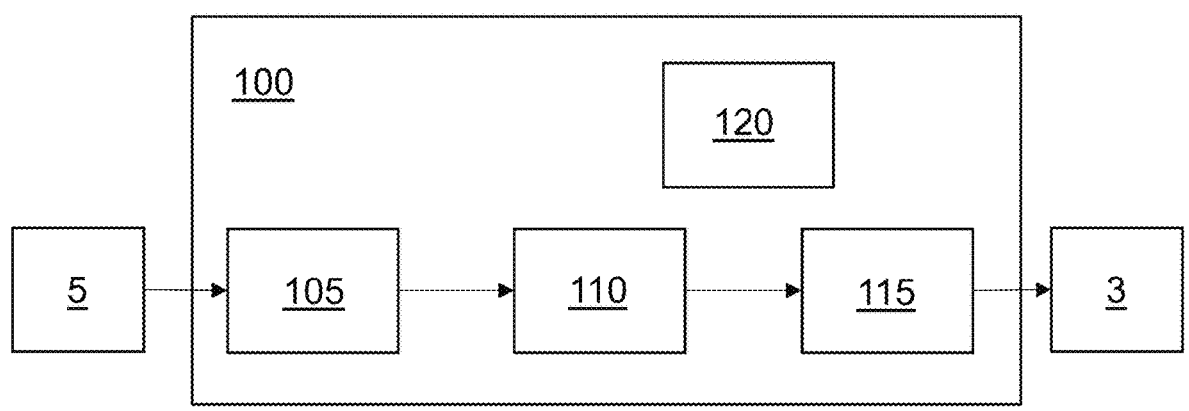
FIG. 2 schematically represents a power system of the vehicle for transporting goods.

The power system 100 is schematically represented in FIG. 2. The power system 100 comprises a multi-speed gearbox 105, a generator 110 and an energy storage device 115. The power system 100 also comprises a controller 120.

The multi-speed gearbox 105 is mechanically coupled to the generator 110, and is also operable to be mechanically coupled to an axle 5 of the wheels 6 of the trailer 2. The multi-speed gearbox 105 is thus operable to mechanically couple the axle 5 to the generator 110, such that torque is transferred from the axle 5 to the generator 110. The multi-speed gearbox 105 comprises, or is provided in combination with, a clutch which enables the generator 110 to be selectively engaged to and/or disengaged from the axle 5.

The generator 110 is an induction-type generator arranged to convert the rotational input force received from the multi-speed gearbox 105 into electrical power. The generator 110 is connected to the energy storage device 115, and supplies the generated electrical power to the energy storage device 115.

The energy storage device 115 is arranged to store electrical energy, and also to supply electrical energy to the TRU 3 according to a power demand of the TRU 3. The energy storage device 115 comprises a battery in the present embodiment.

The energy storage device 115 can be considered to generally operate in one of three modes.

In a first mode, the energy storage device 115 may receive more electrical power from the generator 110 than is required to power the TRU 3. In this first mode, the energy storage device 115 is arranged to recharge (i.e. the state-of-charge of the energy storage device 115 increases) as well as to provide electrical power to the TRU 3. The first mode may be described as a charge mode.

In a second mode, the energy storage device 115 may receive electrical power from the generator 110 substantially equal to the power consumption of the TRU 3. In this second mode, the energy storage device 115 may maintain a roughly constant state-of-charge and thus generally provides an amount of electrical power to the TRU 3 equal to the amount supplied by the generator 110. The second mode may be described as a steady state mode.

In a third mode, the energy storage device 115 may receive less electrical power from the generator 110 than is required to power the TRU 3. In this third mode, the energy storage device 115 is arranged to discharge such that the TRU 3 remains adequately powered (i.e. the state-of-charge of the energy storage device 115 decreases), and thus in the third mode the energy storage device 115 may be generally considered as supplementing the electrical power generated by the generator 110. The third mode may be described as a discharge mode.

The controller 120 is in communication with at least the multi-speed gearbox 105, the energy storage device 115, the TRU 3 and the engine management system 200. The controller 120 is arranged to receive data indicative of a speed of the vehicle 1, e.g. from a speedometer belonging to the engine management system 200 of the tractor 4 or from an axle speed sensor of the trailer 2, and is also arranged to receive data indicative of a state-of-charge of the energy storage device 115 and a power demand of the TRU 3. The controller 120 is also arranged to control the multi-speed gearbox 105 based on the received data.

Figure 3:
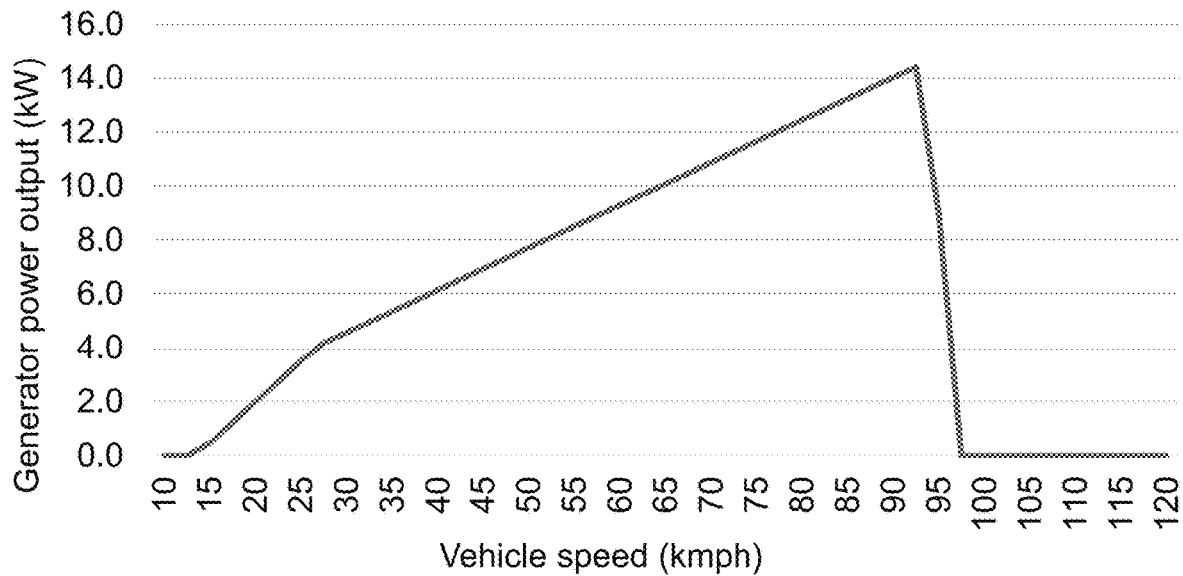
FIG. 3 illustrates how a generator power output may vary with vehicle speed when using a fixed speed gearbox.

FIG. 3 illustrates how a generator power output may vary with vehicle speed when utilising a fixed-speed gearbox, such as is utilised in existing TRU power systems. The electrical power generated by a generator is dependent on a rotational speed of a rotor of the generator. When a fixed-speed gearbox is used to transmit rotational energy from the wheels to the generator, the rotational speed of the rotor of the generator remains proportional to the speed of the axle of the vehicle to which the gearbox is coupled. Accordingly, as the rotational speed of the axle varies during operation of the vehicle, the electrical power generated by the generator also varies when a fixed-speed gearbox is used to couple the generator to the axle.

Figure 4:
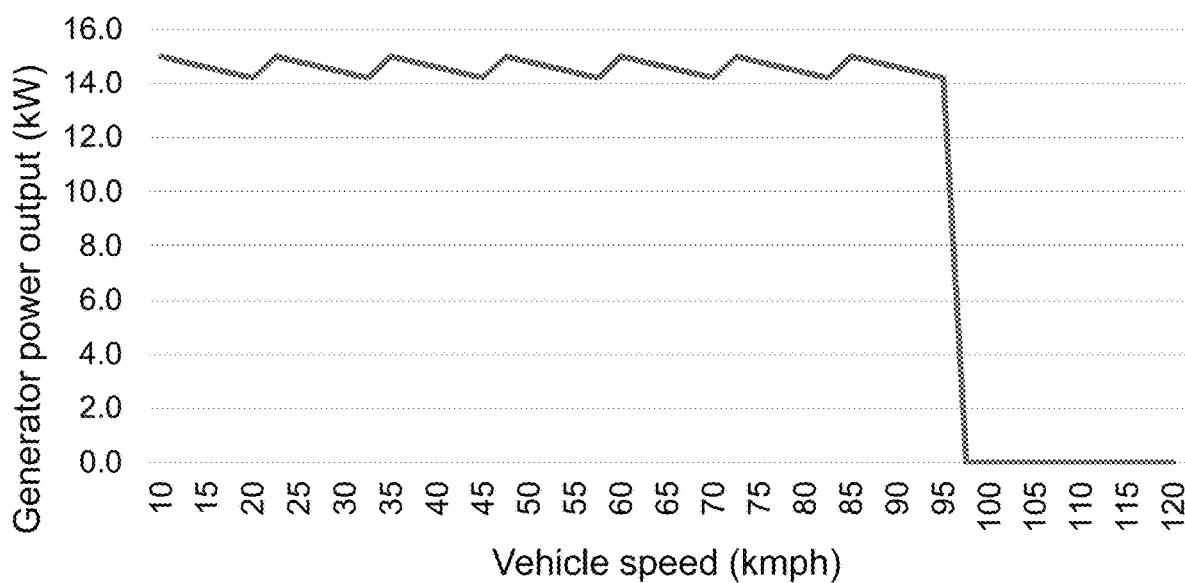
FIG. 4 illustrates how a generator power output may vary with vehicle speed when using a multi-speed gearbox.

FIG. 4 illustrates how a generator power output may vary with vehicle speed when utilising a multi-speed gearbox 105, such as shown in FIGS. 1 and 2. In contrast to the generator power output when a fixed-speed gearbox is used, the power output can remain substantially constant across the range of operational vehicle speeds. This is because the multi-speed gearbox 105 may be controlled to operate at a desired gear ratio based on the speed of the vehicle 1, so as to maintain a desired generator power output across a range of vehicle speeds. Depending on the gear ratios selected at each speed, the generator power output can be maintained at various different levels.

In the present embodiment, the gear ratio selected to obtain the maximum generator power output is described as a "speed-based gear ratio". The speed-based gear ratio is selected based on the speed of the vehicle 1. The speed-based gear ratio is one which maximises the generator power output, at the respective speed of the vehicle 1, whilst not causing a rotational speed of the generator 110 to exceed a predetermined rotational speed threshold for the generator 110.

Each gear ratio of the multi-speed gearbox 105 is associated with a band of vehicle speeds for which said gear ratio is the speed-based gear ratio, i.e. for which that gear ratio achieves the desired maximum operation of the generator 110. At vehicle speeds above that band, the gear ratio would cause a rotational speed of the generator to exceed a safe operational rotational speed of the generator. At speeds below that band, a higher gear ratio could be used to generate greater power output from the generator, without exceeding the safe operational rotational speed of the generator.

Selecting higher gear ratios (such as the speed-based gear ratio which maximises the generator power output) at a respective speed will increase the torque required to propel the vehicle 1, and thus increase a load on the engine of the tractor 4 propelling the vehicle 1. Utilising a higher gear ratio for a respective speed therefore increases the fuel consumption of the vehicle 1.

To conserve the fuel of the vehicle 1 while ensuring the TRU 3 is still adequately powered, the controller 120 is configured to control the multi-speed gearbox 105 based on various operational parameters of the vehicle 1. The controller 120 is configured to determine a state of the vehicle 1, and to operate the multi-speed gearbox 105 depending on the current state of the vehicle 1. Accordingly, depending on the state or required mode of operation of the vehicle 1, the power system 100 may operate to reduce the fuel consumption of the vehicle 1 where feasible whilst ensuring adequate powering of the TRU 3 via the power system 100.

Figure 5:
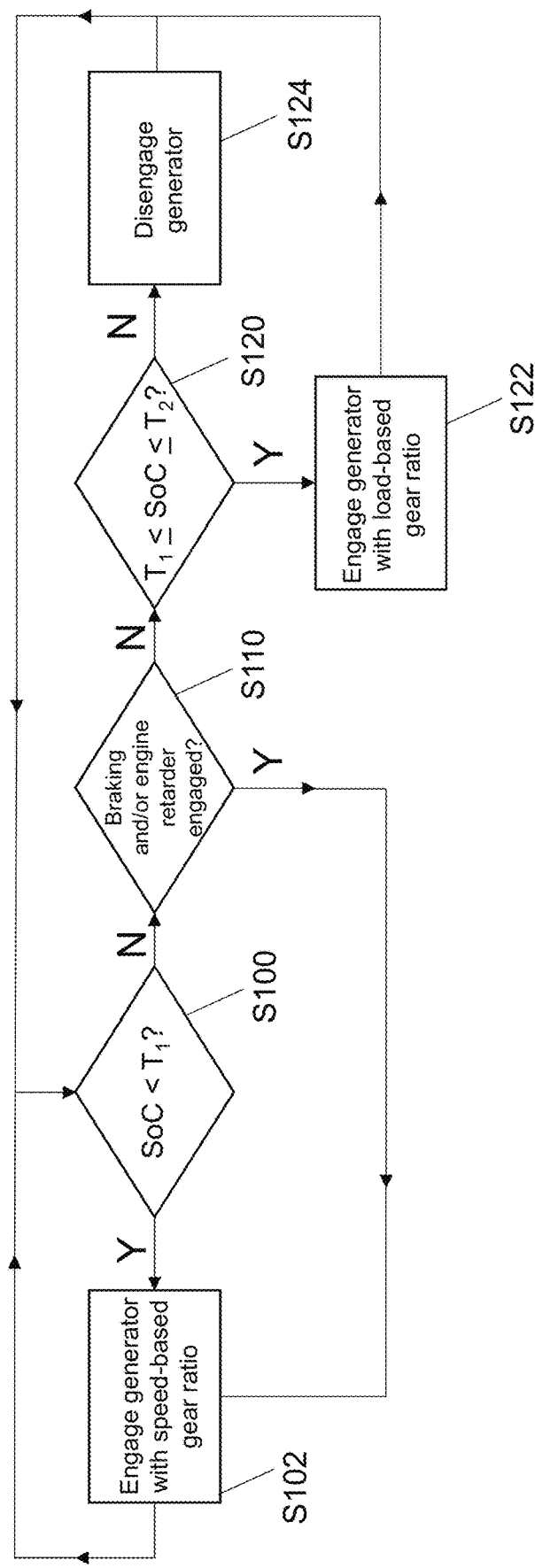
FIG. 5 is a flow chart illustrating logic for operating a power system of the vehicle for transporting goods.

FIG. 5 is a flow chart illustrating logic for the controller 120 when operating the power system 100 of the vehicle 1.

At step S100, the controller 120 determines if a state-of-charge of the energy storage device 115 is below a first charge threshold T1. The first charge threshold T1 represents a desired minimum charge that should be maintained in the energy storage device 115, for example to provide sufficient power to run the TRU 3 for a predetermined period of time if the vehicle 1 is stationary. In the present embodiment, the first charge threshold T1 is 40% of the maximum capacity of the energy storage device 115. However, other thresholds may be used.

If the state-of-charge of the energy storage device 115 is below the first charge threshold T1 (i.e. the determination of step S100 is "yes"), the controller 120 is configured to select the speed-based gear ratio for the multi-speed gearbox 105 (see S102). This gear ratio maximises the power output of the generator 110. As such, when the energy storage device 115 is not sufficiently charged, the electrical power output of the generator 110 is maximised. That is, the generation of electrical power for charging the energy storage device 115 and/or powering the TRU 3 is prioritised. Thus, the energy storage device 115 will operate in the charge mode.

In other words, the controller 120 may determine that the vehicle 1 is in a state in which the state-of-charge of the energy storage device 115 is below the first charge threshold. When the vehicle 1 is in this state, the controller 120 is configured to select the speed-based gear ratio for the multi-speed gearbox.

If the state-of-charge of the energy storage device 115 is above the first charge threshold T1 (i.e. the answer to step S100 is "no"), the controller 120 moves on to step S110.

At step S110, the controller 120 determines if the vehicle 1 is braking and/or if the engine retarder is engaged. When the vehicle 1 is braking or when the engine retarded is engaged, energy is lost through the active slowing of the vehicle 1. Accordingly, when the vehicle 1 is braking or the engine is being retarded, it is desirable for a higher gear ratio to be selected to convert energy that would otherwise be lost during braking into electrical energy, with minimal penalty to the fuel consumption of the vehicle 1.

If the vehicle 1 is braking and/or if the engine retarder is engaged (i.e. the determination of step S110 is "yes"), the controller 120 is configured to select the speed-based gear ratio (see step S102). That is, the controller 120 is configured to operate the multi-speed gearbox 105 to maximise the output of the generator 110. As such, the maximum amount of electrical power can be harvested via the generator 110 without detriment to the fuel economy of the vehicle 1.

In other words, the controller 120 may determine that the vehicle 1 is in a state in which the vehicle 1 is braking and/or the engine retarder is engaged. When the vehicle 1 is in this state, the controller 120 is configured to select the speed-based gear ratio. Thus, the energy storage device 115 will operate in the charge mode.

If the vehicle 1 is not braking and the engine retarder is not engaged (i.e. the answer to step S110 is "no"), the controller 120 moves on to step S120.

At step S120, the controller 120 determines if a state-of-charge of the energy storage device 115 is equal to or between the first charge threshold T1 and a second charge threshold T2. The second charge threshold T2 is greater than the first charge threshold T1, and in the present embodiment is 80% of the maximum capacity of the energy storage device. The second charge threshold T2 represents a desired maximum charge that should be maintained in the energy storage device 115, for example to ensure that there is sufficient charge capacity available to further charge the energy storage device 115 during braking.

If the state-of-charge of the energy storage device 115 is equal to or between the first charge threshold T1 and the second charge threshold T2 (i.e. the determination of step S120 is "yes"), the controller 120 is configured to select a load-based gear ratio (see step S122). The load-based gear ratio is a gear ratio selected based on both the speed of the vehicle 1 and a load associated with the TRU, for example, by balancing a power output of the generator 110 at the respective speed of the vehicle 1 with a power consumption of the TRU 3. The load-based gear ratio is usually lower than the speed-based gear ratio.

In other words, the controller 120 may determine that the vehicle 1 is in a state in which the state-of-charge of the energy storage device 115 is above the first charge threshold T1 and below the second charge threshold T2, and therefore that it is desirable to maintain the state-of-charge of the energy storage device 115 to be substantially constant. When the vehicle 1 is in this state, the controller 120 is configured to select a gear ratio lower than the speed-based gear ratio (for example, the load-based gear ratio). Thus, the energy storage device 115 will operate in the steady-state mode.

Accordingly, selecting the load-based gear ratio when the state-of-charge is above the first charge threshold T1 and below the second charge threshold T2 may ensure the TRU 3 is adequately powered and that fuel consumption is reduced compared to when the speed-based gear ratio is selected. That is, the generation of electrical power for powering the TRU 3 may be balanced against the desire to reduce the fuel consumption of the vehicle.

If the state-of-charge of the energy storage device 115 is above the second charge threshold T2 (i.e. the answer to step S120 is "no"), the controller 120 moves on to step S124. At step S124, the controller 120 is configured to disengage the multi-speed gearbox 105.

When the state of charge of the energy storage device 115 is above the second charge threshold T2, the energy storage device 115 is considered to be adequately charged such that it is advantageous to prioritise reducing the fuel consumption of the vehicle 1. That is, when the energy storage device 115 is adequately charged, it is appropriate to discharge the energy storage device 115 to reduce fuel consumption of the vehicle 1. This may occur, for example, after charging the energy storage device 115 during braking.

Thus, if the state-of-charge of the energy storage device 115 is above the second charge threshold T2 and the vehicle 1 is not braking or has its engine retarder engaged it is desirable to disengage the generator 110 from the axle 5 via the multi-speed gearbox 105. Thus, the energy storage device 115 will operate in the discharge mode.

Whilst in the present embodiment the controller 120 is configured to disengage the multi-speed gearbox 105 when the state-of-charge of the energy storage device is above the second charge threshold T2, in other embodiments the controller 120 may instead select a gear ratio that is lower than the load-based gear ratio at the respective speed of the vehicle 1.

In other embodiments, the controller 120 is also configured to determine if other operational criteria are satisfied, and to control the multi-speed gearbox 105 accordingly.

In some embodiments, the controller 120 is configured to disengage the multi-speed gearbox 105 or to set the gear ratio to a gear ratio that is lower than the speed-based gear ratio when the vehicle 1 is in a state in which the speed of the vehicle 1 is increasing. For example, the controller 120 may be configured to disengage the multi-speed gearbox 105 when the vehicle is in a state in which the speed of the vehicle 1 is increasing and the state-of-charge of the energy storage device 115 is above the first charge threshold T1. Additionally, the controller 120 may be configured to set the gear ratio to a gear ratio lower than the speed-based gear ratio (e.g. the load-based gear ratio) when the vehicle 1 is in a state in which the speed of the vehicle 1 is increasing and the state-of-charge of the energy storage device 115 is below the first charge threshold T1. By not operating the multi-speed gearbox 105 at the speed-based gear ratio when the vehicle speed is increasing, the fuel efficiency for the vehicle 1 may be improved, since the fuel efficiency of the engine is typically lower when the vehicle 1 is accelerating.

Whilst the vehicle 1 described in the above-mentioned embodiments is a tractor-trailer system 1, the teachings of the power system 100 are also applicable to other vehicles. For example, in other embodiments, the vehicle may instead be one of a car, van, box lorry, goods wagon or the like.

While the invention has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A vehicle for transporting goods comprising:
   an axle;
   a transport refrigeration unit (TRU); and
   a power system, the power system comprising:
      an energy storage device configured to electrically power the TRU;
      a generator configured to generate electrical power and to supply the electrical power to the energy storage device;
      a multi-speed gearbox mechanically coupling the axle to the generator; and
      a controller configured to receive data indicative of a speed of the vehicle and a state-of-charge of the energy storage device, and to control the multi-speed gearbox;
   wherein the controller is configured to set a gear ratio of the multi-speed gearbox to a speed-based gear ratio when the vehicle is in a first state, wherein the speed-based gear ratio is selected based on the speed of the vehicle, and wherein the state-of-charge of the energy storage device is below a first charge threshold in the first state; and
   wherein the controller is configured to disengage the multi-speed gearbox or to set the gear ratio to a gear ratio that is lower than the speed-based gear ratio when the vehicle is in a second state, wherein the state-of-charge of the energy storage device is above the first charge threshold in the second state.

2. The vehicle as claimed in claim 1, wherein the speed-based gear ratio corresponds to a maximum gear ratio of the multi-speed gear box that does not cause a rotational speed of the generator to exceed a predetermined rotational speed threshold at the respective speed of the vehicle.

3. The vehicle as claimed in claim 1, wherein the controller is configured to set the gear ratio to a gear ratio that is lower than the speed-based gear ratio when the vehicle is in the second state, wherein the state-of-charge of the energy storage device is above the first charge threshold and below a second charge threshold in the second state, wherein the second charge threshold is greater than the first charge threshold; and
   wherein the controller is configured to disengage the multi-speed gearbox when the vehicle is in a third state, wherein the state-of-charge of the energy storage device is above the second charge threshold in the third state.

4. The vehicle as claimed in claim 1, wherein the controller (120) is configured to set the gear ratio to a load-based gear ratio that is lower than the speed-based gear ratio when the vehicle (1; 2) is in the second state.

5. The vehicle as claimed in claim 1, wherein the controller is configured to disengage the multi-speed gearbox or to set the gear ratio to a gear ratio that is lower than the speed-based gear ratio when the vehicle is in a fourth state, wherein the speed of the vehicle is increasing in the fourth state.

6. The vehicle as claimed in claim 1, wherein the controller is configured to receive data indicative of a fuel level associated with an engine propelling the vehicle; and
wherein the controller is configured to disengage the multi-speed gearbox or to set the gear ratio to a gear ratio that is lower than the speed-based gear ratio when the vehicle is in a fifth state, wherein the fuel level is below a first fuel threshold in the fifth state.

7. The vehicle as claimed in claim 1, wherein the controller is configured to receive data indicative of braking of the vehicle and
wherein the controller is configured to set the gear ratio to the speed-based gear ratio when the vehicle is in a sixth state, wherein the vehicle is braking in the sixth state.

8. A system for transporting goods, the system comprising: a vehicle as claimed in claim 1, wherein the vehicle further comprises a tractor and a trailer.

9. The tractor trailer-system as claimed in claim 8, wherein the tractor comprises an engine management system, the engine management system comprising a plurality of sensors configured to monitor one or more operational parameters of the tractor; and
wherein the controller is configured to receive data indicative of the one or more operational parameters from the engine management system and to determine a state of the trailer based on the operational parameters.

10. A method of operating a power system of a vehicle for transporting goods, the vehicle comprising a transport refrigeration unit and the power system comprising an energy storage device operable to electrically power the TRU, a generator configured to generate electrical power and to supply the electrical power to the energy storage device, and a multi-speed gearbox mechanically coupling an axle of the vehicle to the generator, the method comprising:
setting a gear ratio of the multi-speed gearbox to a speed-based gear ratio when the vehicle is in a first state, wherein the speed-based gear ratio is selected based on a speed of the vehicle, and wherein a state-of-charge of the energy storage device is below a first charge threshold in the first state; and
disengaging the multi-speed gearbox or setting the gear ratio to a gear ratio that is lower than the speed-based gear ratio when the vehicle is in a second state, wherein the state-of-charge of the energy storage device is above the first charge threshold.

11. The method as claimed in claim 10, comprising:
disengaging the multi-speed gearbox or setting the gear ratio to a gear ratio that is lower than the speed-based gear ratio when the vehicle is in a fourth state, wherein the speed of the vehicle is increasing in the fourth state.

12. The method as claimed in claim 10, comprising:
disengaging the multi-speed gearbox or setting the gear ratio to a gear ratio that is lower than the speed-based gear ratio when the vehicle is in a fifth state, wherein a fuel level associated with an engine propelling the vehicle is below a first fuel threshold in the fifth state.

13. The method as claimed in claim 10, the method comprising:
setting the gear ratio to the speed-based gear ratio when the vehicle is in a sixth state, wherein the vehicle is braking in the sixth state.

14. The method as claimed in claim 10, the method comprising:
disengaging the multi-speed gearbox when the vehicle is in a third state, wherein the state-of-charge of the energy storage device is above a second charge threshold in the third state.

15. The method as claimed in claim 14, wherein the second charge threshold is greater than the first charge threshold.

* * * * *